(12) United States Patent
Lu et al.

(10) Patent No.: US 10,687,249 B2
(45) Date of Patent: Jun. 16, 2020

(54) DATA PACKET TRANSMISSION METHOD AND DEVICE

(71) Applicant: Huawei Technologies Co., Ltd., Shenzhen, Guangdong (CN)

(72) Inventors: Zhenwei Lu, Beijing (CN); Weijun Sun, Beijing (CN)

(73) Assignee: HUAWEI TECHNOLOGIES CO., LTD., Shenzhen, Guangdong (CN)

(\*) Notice: Subject to any disclaimer, the term of this patent is extended or adjusted under 35 U.S.C. 154(b) by 93 days.

(21) Appl. No.: 15/866,274

(22) Filed: Jan. 9, 2018

(65) Prior Publication Data
US 2018/0132136 A1 May 10, 2018

Related U.S. Application Data

(63) Continuation of application No. PCT/CN2015/085204, filed on Jul. 27, 2015.

(51) Int. Cl.
*H04W 28/06* (2009.01)
*H04W 72/04* (2009.01)
(Continued)

(52) U.S. Cl.
CPC ......... *H04W 28/065* (2013.01); *H04W 72/04* (2013.01); *H04W 72/0446* (2013.01);
(Continued)

(58) Field of Classification Search
None
See application file for complete search history.

(56) References Cited

U.S. PATENT DOCUMENTS

| 2005/0047416 A1* | 3/2005 | Heo | ........................ | H04W 8/24 370/395.4 |
| 2009/0161688 A1* | 6/2009 | Park | ...................... | H04W 48/08 370/441 |

(Continued)

FOREIGN PATENT DOCUMENTS

| CN | 103491572 A | 1/2014 |
| CN | 103491872 A | 1/2014 |

(Continued)

OTHER PUBLICATIONS

Huawei et al; "On the Benefits of a Feedback Loop for D2D Communication"; 3GPP TSG RAN WG1 Meeting #76; R1-140051; Prague, Czech Republic; Feb. 10-14, 2014; 4 pages.

(Continued)

*Primary Examiner* — Bunjob Jaroenchonwanit
(74) *Attorney, Agent, or Firm* — Womble Bond Dickinson (US) LLP

(57) ABSTRACT

The present disclosure provides a data packet transmission method and a device. The method includes: performing, by a transmit end device, channel coding on a to-be-sent data packet, and dividing the coded data packet into at least two data sub-packets; allocating a transmission resource to each data sub-packet; generating control information for each data sub-packet according to transmission resources of the at least two data sub-packets; and sending each data sub-packet and the control information of the data sub-packet on a corresponding transmission resource. A data packet and control information indicating a transmission resource of a data sub-packet are transmitted simultaneously, so that a receive end device can recognize multiple transmissions of a same data packet, and perform joint processing on multiple data sub-packets corresponding to the same data packet to (Continued)

obtain the sent data packet, and data packet transmission reliability is improved.

7 Claims, 7 Drawing Sheets

(51) Int. Cl.
   *H04W 72/12* (2009.01)
   *H04W 76/14* (2018.01)
   *H04W 92/18* (2009.01)
   *H04W 28/10* (2009.01)

(52) U.S. Cl.
   CPC ........ *H04W 72/1263* (2013.01); *H04W 28/10* (2013.01); *H04W 76/14* (2018.02); *H04W 92/18* (2013.01)

(56) References Cited

U.S. PATENT DOCUMENTS

| | | | |
|---|---|---|---|
| 2011/0296268 A1* | 12/2011 | Ao | H04L 1/1838 714/748 |
| 2013/0324872 A1 | 12/2013 | Babaeizadeh et al. | |
| 2014/0376381 A1* | 12/2014 | Yuan | H04W 72/1289 370/236 |
| 2015/0146615 A1* | 5/2015 | Yu | H04L 5/0032 370/328 |
| 2016/0286570 A1 | 9/2016 | Chae et al. | |
| 2017/0079085 A1 | 3/2017 | Yang et al. | |
| 2017/0171874 A1* | 6/2017 | Kim | H04W 28/02 |
| 2019/0215174 A1* | 7/2019 | Huang | H04W 72/005 |

FOREIGN PATENT DOCUMENTS

| | | |
|---|---|---|
| CN | 104079351 A | 10/2014 |
| CN | 104202740 A | 12/2014 |
| WO | 2015055257 A1 | 4/2015 |
| WO | 2015065015 A1 | 5/2015 |

OTHER PUBLICATIONS

Huawei et al.; "Physical channel design for D2D communication"; 3GPP TSG RAN WG1 Meeting #76; R1-140053; Prague, Czech Republic; Feb. 10-14, 2014; 6 pages.

Fujitsu; "Further Analysis on Control Information for D2D Communication"; 3GPP TSG RAN WG1 Meeting #76; R1-140196; Feb. 10-14, 2014; 3 pages.

Fujitsu; "Further analysis on control signal and Scheduling Assignment for D2D communication"; 3GPP TSG-RAN1 #76bis; R1-141229; Shenzhen, China; Mar. 31st-Apr. 4th, 2014; 8 pages.

Catr; "On control information of D2D communication"; 3GPP TSG RAN WG1 Meeting #76bis; R1-141601; Shenzhen, China; Mar. 31-Apr. 4, 2014; 2 pages.

Ericsson; "D2D Scheduling Procedure"; 3GPP TSG-RAN WG2 #84; Tdoc R2-134238; San Francisco, USA; Nov. 11-15, 2013; 8 pages.

Office Action, dated Apr. 3, 2019, in Chinese Application No. 201580065310.4 (6 pp.).

* cited by examiner

DATA PACKET TRANSMISSION METHOD AND DEVICE

CROSS-REFERENCE TO RELATED APPLICATIONS

This application is a continuation of International Application No. PCT/CN2015/085204, filed on Jul. 27, 2015, which is hereby incorporated by reference in their entireties.

TECHNICAL FIELD

Embodiments of the present application relate to communications technologies, and in particular, to a data packet transmission method and a device.

BACKGROUND

Device-to-device (D2D) communication mainly indicates D2D unicast communication or D2D broadcast/multicast communication. In a D2D unicast communications system, a device directly communicates with only another device. In a D2D broadcast/multicast communications system, a device simultaneously sends a data packet of the device to multiple devices near the device.

In the D2D broadcast/multicast communications system, D2D communication in the Long Term Evolution (LTE) is used as an example. FIG. 1 is a schematic diagram of a common D2D transmission manner. As shown in FIG. 1, a scheduling assignment (SA) is transmitted in an SA resource pool, and data is transmitted in a data resource pool. The SA resource pool and the data resource pool are separated in a time domain. For example, after transmission begins, the SA is transmitted first for two times, and then the data is transmitted for four times. The SA of a transmit end includes a time resource pattern of transmission that indicates a location at which the data is transmitted each time in the time domain, further includes resource assignments (RA) that indicate a location at which the data is transmitted for the first time in a frequency domain, and includes frequency hopping indication information indicating whether frequency hopping occurs in the frequency domain during the four transmissions. A receive end needs to correctly receive the SA in the SA resource pool first, can determine a location in the frequency domain for last three transmissions according to a frequency domain location for the first transmission and the frequency hopping indication information, then receives the data on a corresponding time-frequency domain resource in the data resource pool according to the time-frequency domain location information indicated by the SA, and then performs decoding or joint processing on obtained data transmitted each time to obtain the data packet. That is, the receive end can obtain the data packet of the transmit end only when little interference is imposed on the SA and the data.

Because the SA and the data packet are separately transmitted, the data packet can be obtained only when both the SA and the data packet are successfully transmitted. However, both the SA and the data packet may fail to be transmitted or may be transmitted with an error because of a transmission collision, half duplexing, in-band leakage, or the like, thereby causing relatively low transmission reliability of D2D communication.

SUMMARY

Embodiments of the present disclosure provide a data packet transmission method and a device, so as to resolve the following problem: When an SA and a data packet are separately sent, the data packet can be obtained only when both the SA and the data packet are successfully transmitted; however, both the SA and the data packet may fail to be transmitted or may be transmitted with an error because of a transmission collision, half duplexing, in-band leakage, or the like, thereby causing relatively low transmission reliability of D2D communication.

A first aspect of the present disclosure provides a data packet transmission method, including:

performing channel coding on a to-be-sent data packet, and dividing the coded data packet into at least two data sub-packets;

allocating a transmission resource to each data sub-packet;

generating control information for each data sub-packet according to transmission resources of the at least two data sub-packets, where the control information of each data sub-packet is used to indicate the transmission resources of the at least two data sub-packets of the data packet to which the data sub-packet belongs; and sending each data sub-packet and the control information of the data sub-packet on a corresponding transmission resource.

With reference to the first aspect, in a first possible implementation of the first aspect, the control information of each data sub-packet is specifically used to indicate a transmission resource of a first data sub-packet of the data packet to which the data sub-packet belongs, and the first data sub-packet is a data sub-packet that is sent first in the data packet.

With reference to the first aspect or the first possible implementation of the first aspect, in a second possible implementation of the first aspect, the transmission resource includes a time resource and a frequency resource.

With reference to any one of the first aspect, or the first or the second possible implementation of the first aspect, in a third possible implementation of the first aspect, the method further includes:

determining a transmission format for each data sub-packet, where the transmission format includes a modulation order and/or a coding redundancy version number; and the generating control information for each data sub-packet according to transmission resources of the at least two data sub-packets includes:

generating the control information for each data sub-packet according to the transmission resources and transmission formats of the at least two data sub-packets, where the control information is further used to indicate the transmission formats of the at least two data sub-packets of the data packet to which the data sub-packet belongs.

A second aspect of the present disclosure provides a data packet transmission method, including:

performing channel coding on a to-be-sent data packet, and dividing the coded data packet into at least two data sub-packets;

allocating a transmission resource to each data sub-packet;

generating control information for each data sub-packet, where the control information of each data sub-packet includes a numeral designation of the data packet to which the data sub-packet belongs; and sending each data sub-packet and the control information of the data sub-packet on a corresponding transmission resource according to the transmission resource of each data sub-packet.

A third aspect of the present disclosure provides a data packet transmission method, including:

receiving at least two data sub-packets and control information of each data sub-packet that are sent by a transmit end device, where the control information of each data sub-packet is used to indicate transmission resources of the at least two data sub-packets of the data packet to which the data sub-packet belongs; and decoding the control information of each data sub-packet, to obtain at least two data sub-packets that belong to a same data packet, and performing joint processing on the at least two data sub-packets, to obtain a first data packet sent by the transmit end device.

With reference to the third aspect, in a first possible implementation of the third aspect, the control information of each data sub-packet is specifically used to indicate a transmission resource of a first data sub-packet of the data packet to which the data sub-packet belongs, and the first data sub-packet is a data sub-packet that is sent first in the data packet.

With reference to the third aspect or the first possible implementation of the third aspect, in a second possible implementation of the third aspect, the transmission resource includes a time resource and a frequency resource.

With reference to any one of the third aspect, or the first or the second possible implementation of the third aspect, in a third possible implementation of the third aspect, the control information of each data sub-packet is further used to indicate transmission formats of the at least two data sub-packets of the data packet to which the data sub-packet belongs, and the transmission formats include a modulation order and/or a coding redundancy version number.

With reference to the first possible implementation of the third aspect, in a fourth possible implementation of the third aspect, the decoding the control information of each data sub-packet, to obtain at least two data sub-packets that belong to a same data packet, and performing joint processing on the at least two data sub-packets, to obtain a first data packet sent by the transmit end device includes: when a transmission resource of a first data sub-packet of the first data packet is correctly obtained for the first time, obtaining, by means of calculation according to the transmission resource of the first data sub-packet, at least one transmission resource used by at least one second data sub-packet of the first data packet, where the first data sub-packet is a data sub-packet that is sent first in the data packet;

receiving a corresponding second data sub-packet on a transmission resource used by each second data sub-packet; and performing joint processing and decoding on the first data sub-packet and the at least one second data sub-packet, to obtain the first data packet sent by the transmit end.

With reference to the third aspect, in a fifth possible implementation of the third aspect, if the control information of each data sub-packet includes a transmission resource of each data sub-packet of a first data packet to which the data sub-packet belongs, the decoding the control information of each data sub-packet, to obtain at least two data sub-packets that belong to a same data packet, and performing joint processing on the at least two data sub-packets, to obtain a first data packet sent by the transmit end device includes:

when the control information of the data sub-packet is correctly obtained for the first time, obtaining, according to the control information, the transmission resource of each data sub-packet of the first data packet to which the data sub-packet belongs;

receiving at least one data sub-packet on each transmission resource other than the transmission resource used for a current transmission; and performing joint processing and decoding on the at least two data sub-packets that belong to the first data packet, to obtain the first data packet sent by the transmit end.

A fourth aspect of the present disclosure provides a data packet transmission method, including:

receiving at least two data sub-packets and control information of each data sub-packet that are sent by a transmit end device, where the control information of each data sub-packet includes a numeral designation of a data packet to which the data sub-packet belongs;

decoding the control information of each data sub-packet, to obtain a numeral designation carried in the control information of each data sub-packet; and obtaining, according to a numeral designation corresponding to each data sub-packet, at least two first data sub-packets having a same numeral designation that belongs to a data packet, and performing combination and decoding on the at least two first data sub-packets, to obtain a first data packet sent by the transmit end.

A fifth aspect of the present disclosure provides a transmit end device, including:

a processing module, configured to: perform channel coding on a to-be-sent data packet, and divide the coded data packet into at least two data sub-packets;

an allocation module, configured to allocate a transmission resource to each data sub-packet, where the processing module is further configured to generate control information for each data sub-packet according to transmission resources of the at least two data sub-packets, where the control information of each data sub-packet is used to indicate the transmission resources of the at least two data sub-packets of the data packet to which the data sub-packet belongs; and a sending module, configured to send each data sub-packet and the control information of the data sub-packet on a corresponding transmission resource.

With reference to the fifth aspect, in a first possible implementation of the fifth aspect, the control information generated by the processing module for each data sub-packet is specifically used to indicate a transmission resource of a first data sub-packet of the data packet to which the data sub-packet belongs, the first data sub-packet is a data sub-packet that is sent first in the data packet, and the transmission resource includes a time resource and a frequency resource.

With reference to the fifth aspect or the first possible implementation of the fifth aspect, in a second possible implementation of the fifth aspect, the processing module is further configured to determine a transmission format for each data sub-packet, where the transmission format includes a modulation order and/or a coding redundancy version number; and the processing module is specifically configured to generate the control information for each data sub-packet according to the transmission resources and transmission formats of the at least two data sub-packets, where the control information is further used to indicate the transmission formats of the at least two data sub-packets of the data packet to which the data sub-packet belongs.

A sixth aspect of the present disclosure provides a transmit end device, including:

a processing module, configured to: perform channel coding on a to-be-sent data packet, and divide the coded data packet into at least two data sub-packets;

an allocation module, configured to allocate a transmission resource to each data sub-packet, where the processing module is further configured to generate control information for each data sub-packet, where the control information of each data sub-packet includes a numeral designation of the data packet to which the data sub-packet belongs; and a sending module, configured to send each data sub-packet and the control information of the data sub-packet on a corresponding transmission resource according to the transmission resource of each data sub-packet.

A seventh aspect of the present disclosure provides a receive end device, including:

a receiving module, configured to receive at least two data sub-packets and control information of each data sub-packet that are sent by a transmit end device, where the control information of each data sub-packet is used to indicate transmission resources of the at least two data sub-packets of the data packet to which the data sub-packet belongs; and a processing module, configured to: decode the control information of each data sub-packet, to obtain at least two data sub-packets that belong to a same data packet; and perform joint processing on the at least two data sub-packets, to obtain a first data packet sent by the transmit end device.

With reference to the seventh aspect, in a first possible implementation of the seventh aspect, the control information of each data sub-packet received by the receiving module is specifically used to indicate a transmission resource of a first data sub-packet of the data packet to which the data sub-packet belongs, the first data sub-packet is a data sub-packet that is sent first in the data packet, and the transmission resource includes a time resource and a frequency resource.

With reference to the first possible implementation of the seventh aspect, in a second possible implementation of the seventh aspect, the processing module is specifically configured to: when a transmission resource of a first data sub-packet of the first data packet is correctly obtained for the first time, obtain, by means of calculation according to the transmission resource of the first data sub-packet, at least one transmission resource used by at least one second data sub-packet of the first data packet, where the first data sub-packet is a data sub-packet that is sent first in the data packet;

the receiving module is further configured to receive a corresponding second data sub-packet on a transmission resource used by each second data sub-packet; and the processing module is further configured to perform joint processing and decoding on the first data sub-packet and the at least one second data sub-packet, to obtain the first data packet sent by the transmit end.

With reference to the seventh aspect, in a third possible implementation of the seventh aspect, if the control information of each data sub-packet includes a transmission resource of each data sub-packet of a first data packet to which the data sub-packet belongs, the processing module is configured to: when the control information of the data sub-packet is correctly obtained for the first time, obtain, according to the control information, the transmission resource of each data sub-packet of the first data packet to which the data sub-packet belongs;

the receiving module is further configured to receive at least one data sub-packet on each transmission resource other than the transmission resource used for a current transmission; and the processing module is further configured to perform joint processing and decoding on the at least two data sub-packets that belong to the first data packet, to obtain the first data packet sent by the transmit end.

An eighth aspect of the present disclosure provides a receive end device, including:

a receiving module, configured to receive at least two data sub-packets and control information of each data sub-packet that are sent by a transmit end device, where the control information of each data sub-packet includes a numeral designation of a data packet to which the data sub-packet belongs; and a processing module, configured to decode the control information of each data sub-packet, to obtain a numeral designation carried in the control information of each data sub-packet, where the processing module is further configured to: obtain, according to a numeral designation corresponding to each data sub-packet, at least two first data sub-packets having a same numeral designation that belongs to a data packet, and perform joint processing and decoding on the at least two first data sub-packets, to obtain a first data packet sent by the transmit end.

A ninth aspect of the present disclosure provides a transmit end device, including:

a processor, configured to: perform channel coding on a to-be-sent data packet, and divide the coded data packet into at least two data sub-packets, where the processor is further configured to allocate a transmission resource to each data sub-packet; and the processor is further configured to generate control information for each data sub-packet according to transmission resources of the at least two data sub-packets, where the control information of each data sub-packet is used to indicate the transmission resources of the at least two data sub-packets of the data packet to which the data sub-packet belongs; and a transmitter, configured to send each data sub-packet and the control information of the data sub-packet on a corresponding transmission resource.

A tenth aspect of the present disclosure provides a transmit end device, including:

a processor, configured to: perform channel coding on a to-be-sent data packet, and divide the coded data packet into at least two data sub-packets, where the processor is further configured to allocate a transmission resource to each data sub-packet; and the processor is further configured to generate control information for each data sub-packet, where the control information of each data sub-packet includes a numeral designation of the data packet to which the data sub-packet belongs; and a transmitter, configured to send each data sub-packet and the control information of the data sub-packet on a corresponding transmission resource according to the transmission resource of each data sub-packet.

An eleventh aspect of the present disclosure provides a receive end device, including:

a receiver, configured to receive at least two data sub-packets and control information of each data sub-packet that are sent by a transmit end device, where the control information of each data sub-packet is used to indicate transmission resources of the at least two data sub-packets of the data packet to which the data sub-packet belongs; and a processor, configured to: decode the control information of each data sub-packet, to obtain at least two data sub-packets that belong to a same data packet; and perform joint processing on the at least two data sub-packets, to obtain a first data packet sent by the transmit end device.

A twelfth aspect of the present disclosure provides a receive end device, including:

a receiver, configured to receive at least two data sub-packets and control information of each data sub-packet that are sent by a transmit end device, where the control information of each data sub-packet includes a numeral designation of a data packet to which the data sub-packet belongs; and a processor, configured to decode the control information of each data sub-packet, to obtain a numeral designation carried in the control information of each data sub-packet, where the processor is further configured to: obtain, according to a numeral designation corresponding to each data sub-packet, at least two first data sub-packets having a same numeral designation that belongs to a data packet, and perform joint processing and decoding on the at least two first data sub-packets, to obtain a first data packet sent by the transmit end.

According to the data packet transmission method and the device provided in the present disclosure, the transmit end device generates the control information according to the transmission resource allocated to each data sub-packet of the to-be-sent data packet, and the control information of each data sub-packet is used to indicate the transmission resources of the at least two data sub-packets of the data packet to which the data sub-packet belongs. The data sub-packet and the control information are transmitted simultaneously, so that the receive end device can recognize multiple transmitted data sub-packets of a same data packet according to control information, and perform joint processing on the multiple data sub-packets corresponding to the same data packet to obtain the data packet sent by the transmit end. Therefore, a problem that a data packet to which multiple data sub-packets belong cannot be recognized is avoided, and data packet transmission reliability is improved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
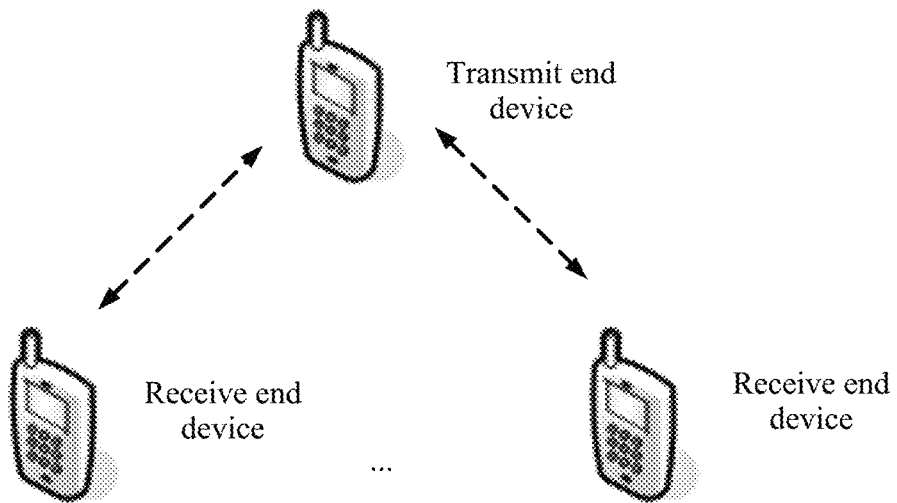
FIG. 1 is a schematic diagram of a communications scenario of the present disclosure.

FIG. 1 is a schematic diagram of a communications scenario of the present disclosure. Solutions of the present disclosure may be applied between terminal devices. When a data packet is transmitted, a transmit end device sends the data packet after inserting control information into the data packet, and a receive end device performs processing according to the control information. In a general communications scenario, at least one transmit end device and at least one receive end device are included. As shown in FIG. 1, one transmit end device and two receive end devices that may perform D2D communication may be included. A mobile phone is used as an example in the figure. A device of the present disclosure is not limited to a mobile phone, may further be a tablet computer, an intelligent terminal, or the like, and is not specifically limited.

Figure 2:
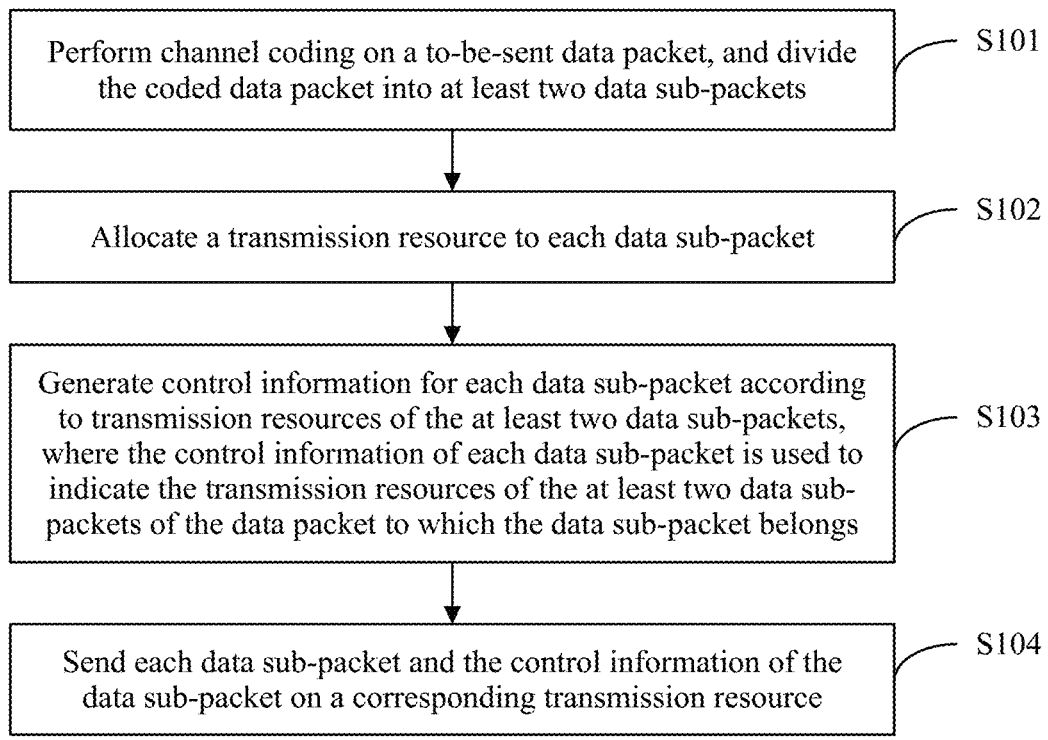
FIG. 2 is a flowchart of a data packet transmission method according to Embodiment 1 of the present disclosure.

FIG. 2 is a flowchart of a data packet transmission method according to Embodiment 1 of the present disclosure. As shown in FIG. 2, on the basis of a communications scenario shown in FIG. 1, the solution is executed by a transmit end device. Specific steps of the data packet transmission method include the following steps.

S101. Perform channel coding on a to-be-sent data packet, and divide the coded data packet into at least two data sub-packets.

S102. Allocate a transmission resource to each data sub-packet.

In this embodiment, generally, the to-be-sent data packet is relatively large, and therefore, the data packet cannot be directly sent. Therefore, the data packet needs to be blocked after being coded, and the coded data packet is divided into multiple data sub-packets to be separately transmitted. When the data packet is divided into the multiple data sub-packets, each data sub-packet needs to be allocated a transmission resource, including a time resource and a frequency resource.

S103. Generate control information for each data sub-packet according to transmission resources of the at least two data sub-packets, where the control information of each data sub-packet is used to indicate the transmission resources of the at least two data sub-packets of the data packet to which the data sub-packet belongs.

In this embodiment, the transmit end device needs to generate the control information for the data sub-packet according to the transmission resource of each data sub-packet of the to-be-sent data packet. In addition to a modulation coding manner used by a data information bit, the control information further includes information that can identify the first data packet, as specifically described below.

The control information includes an information bit that can indicate the transmission resources of the at least two data sub-packets of the data packet to which the data sub-packet belongs. That the control information indicates the transmission resources of the at least two data sub-packets of the data packet includes:

The control information indicates transmission resource information used by a data sub-packet that is transmitted first in the data packet, and a receive end device may obtain, by means of calculation, transmission resource information of another data sub-packet according to the transmission resource used by the data sub-packet that is transmitted first. That is, the control information of each data sub-packet is specifically used to indicate a transmission resource of a first data sub-packet of the data packet to which the data sub-packet belongs, and the first data sub-packet is a data sub-packet that is sent first in the data packet.

Alternatively, the control information indicates transmission resource information used by a data sub-packet transmitted each time in the data packet, so that the receive end device may determine data sub-packets that belong to a same data packet after successfully receiving multiple data sub-packets. The transmission resource of the data sub-packet generally includes a time resource and a frequency resource.

Optionally, the control information further includes a quantity of times of transmitting the data packet (that is, a quantity of data sub-packets). A common manner of transmitting data is a fixed quantity of transmission times, and is specified in a protocol in advance. However, when the quantity of the transmission times needs to change, the quantity of the transmission times may also be indicated in the control information, to point out a quantity of times of transmitting the first data packet, so that the receive end device can perform processing.

S104. Send each data sub-packet and the control information of the data sub-packet on a corresponding transmission resource.

In this embodiment, each data sub-packet and the control information of the data packet to which the data sub-packet belongs are sent on the corresponding transmission resource, and may be sent to a receive end device in a unicast manner, or may be sent in a multicast or a broadcast manner. This is not limited in the present disclosure.

After receiving multiple transmitted data sub-packets, the receive end device successively obtains, according to the correctly obtained control information of the data sub-packet, another data sub-packet that belongs to a same data packet, and then performs joint receiving processing on the obtained multiple data sub-packets, to obtain the first data packet that is sent by the transmit end device.

Optionally, before the step S103, the method may further include: determining a transmission format for each data sub-packet, where the transmission format includes a modulation order and/or a coding redundancy version number.

The generating control information for each data sub-packet according to transmission resources of the at least two data sub-packets in step S103 includes: generating the control information for each data sub-packet according to the transmission resources and transmission formats of the at least two data sub-packets, where the control information is further used to indicate the transmission formats of the at least two data sub-packets of the data packet to which the data sub-packet belongs.

In the data packet transmission method provided in this embodiment, the transmit end device sends each data sub-packet of the to-be-sent data packet and the corresponding control information bit on the corresponding transmission resource, so that the receive end device obtains at least two data sub-packets that belong to a same first data packet from the control information bit corresponding to the received data sub-packet, and performs joint processing to obtain the first data packet. The data sub-packet and the control information are transmitted simultaneously, so that the receive end device can identify multiple transmissions of a same data packet according to the control information of each data sub-packet, and perform joint processing on multiple data sub-packets corresponding to the same data packet to obtain the data packet, and therefore, data packet transmission reliability is improved.

Figure 3:
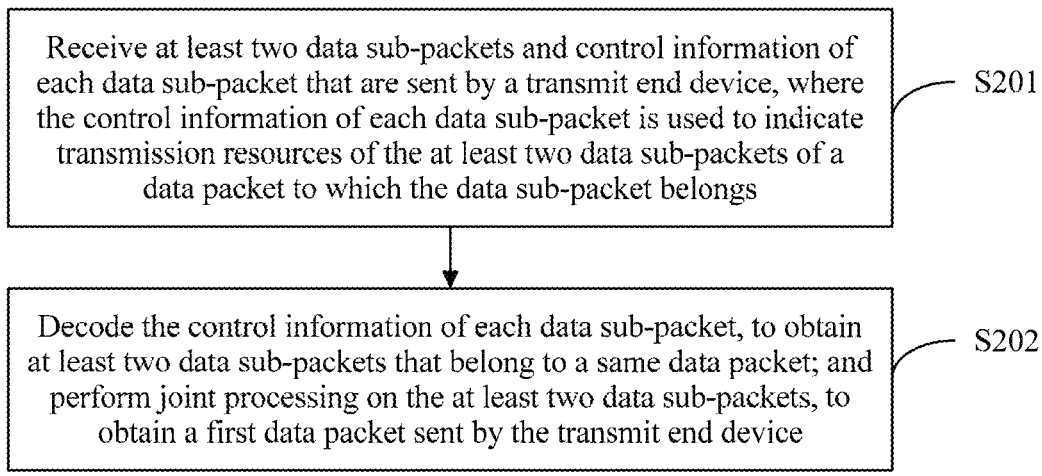
FIG. 3 is a flowchart of a data packet transmission method according to Embodiment 2 of the present disclosure.

FIG. 3 is a flowchart of a data packet transmission method according to Embodiment 2 of the present disclosure. As shown in FIG. 3, on the basis of the communications scenario shown in FIG. 1, the solution is executed by a receive end device. Specific steps of the data packet transmission method include the following steps.

S201. Receive at least two data sub-packets and control information of each data sub-packet that are sent by a transmit end device, where the control information of each data sub-packet is used to indicate transmission resources of the at least two data sub-packets of the data packet to which the data sub-packet belongs.

In this embodiment, transmit end devices may not be a same device, and received data sub-packets may not be data sub-packets of a same data packet. According to the communications scenario shown in FIG. 1, the receive end device may receive many different data sub-packets sent by one or more transmit end devices. Each data sub-packet includes data and control information, and the control information is used to indicate the transmission resources of the at least two data sub-packets of the data packet to which the data sub-packet belongs, so that data sub-packets that belong to a same data packet can be determined from multiple data sub-packets.

Specifically, the control information of each data sub-packet is specifically used to indicate a transmission resource of a first data sub-packet of the data packet to which the data sub-packet belongs, and the first data sub-packet is a data sub-packet that is sent first in the data packet.

Optionally, the control information of the data sub-packet may also point out transmission resources of some or all data sub-packets of the data packet, including a time resource and a frequency resource.

In addition, optionally, the control information of each data sub-packet is further used to indicate transmission formats of the at least two data sub-packets of the data packet to which the data sub-packet belongs, and the transmission format includes a modulation order and/or a coding redundancy version number.

S202. Decode the control information of each data sub-packet, to obtain at least two data sub-packets that belong to a same data packet; and perform joint processing on the at least two data sub-packets, to obtain a first data packet sent by the transmit end device.

In this embodiment, the receive end device obtains control information from a received data sub-packet, and obtains, according to the control information, another data sub-packet that belongs to a same data packet, for example, the first data sub-packet.

The receive end device may perform joint processing on multiple received data sub-packets that belong to a same data packet and that are transmitted for multiple times, to obtain the first data packet sent by the transmit end.

In this embodiment, in specific implementation, the control information of each data sub-packet is used to indicate transmission resource information (for example, first time-frequency resource information) used for first transmitting the data packet to which the data sub-packet belongs or transmission resource information used for transmitting each data sub-packet of the data packet. That is, an information bit used to indicate a time-frequency resource used for transmitting the first data packet may be added into the original control information, so that the receive end device may determine, according to the control information, a data sub-packet that belongs to a same data packet after receiving multiple data sub-packets.

Optionally, the control information further includes a quantity of times of transmitting the data packet. A common manner of transmitting data is a fixed quantity of transmission times, and is specified in a protocol in advance. However, when the quantity of the transmission times needs to change, the quantity of the transmission times may also be indicated in the control information, to point out a quantity of times of transmitting the first data packet.

In the data packet transmission method provided in this embodiment, the transmit end device divides the to-be-sent data packet into data sub-packets, generates the corresponding control information for each data sub-packet, to indicate the transmission resources of the at least two data sub-packets of the data packet to which the data sub-packet belongs, and sends each data sub-packet and the control information of the data sub-packet on the corresponding transmission resource. The receive end device obtains, according to the control information, at least two data sub-packets that belong to the same first data packet from the multiple received data sub-packets, and performs joint processing to obtain the first data packet. The data sub-packet and the control information are transmitted simultaneously, so that the receive end device can identify multiple transmitted data sub-packets of the same data packet, and perform joint processing on the multiple data sub-packets corresponding to the same data packet, and therefore, data packet transmission reliability is improved.

Figure 4A:
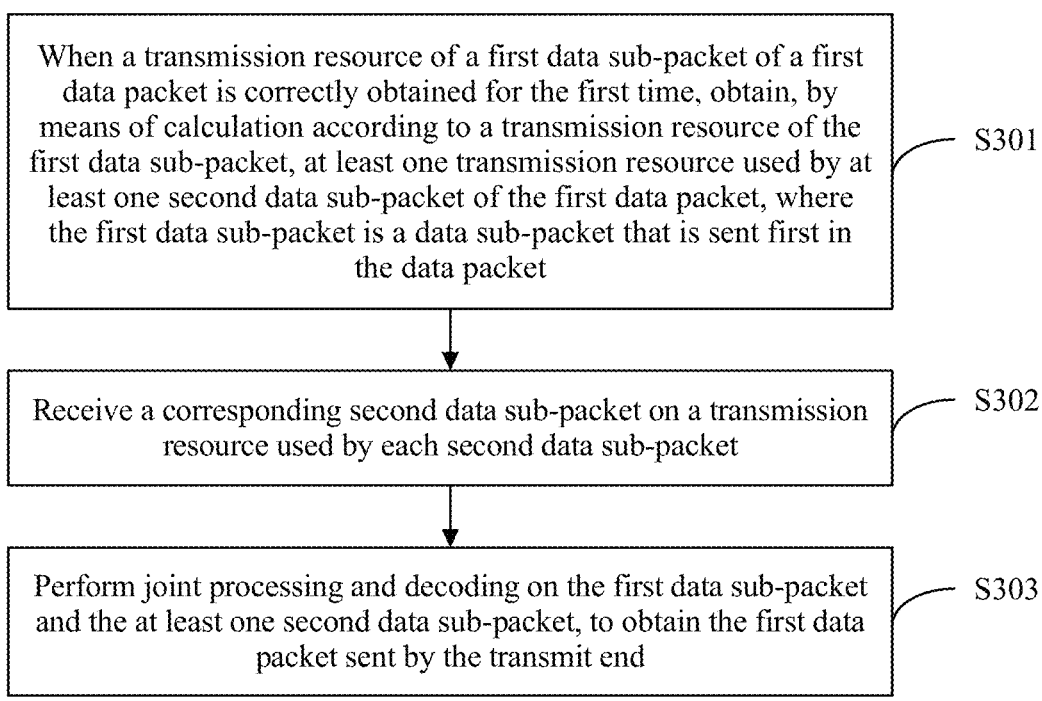
FIG. 4a is a flowchart of a data packet transmission method according to Embodiment 3 of the present disclosure.

FIG. 4a is a flowchart of a data packet transmission method according to Embodiment 3 of the present disclosure. As shown in FIG. 4, on the basis of the communications scenario shown in FIG. 1 and the embodiment shown in FIG. 3, the solution is executed by a receive end device. Control information of a data sub-packet is used to indicate a transmission resource of a first data sub-packet of the data packet to which the data sub-packet belongs, and the first data sub-packet is a data sub-packet that is sent first in the data packet. Specific steps of the step S202 in an embodiment in FIG. 3 include the following steps.

S301. When a transmission resource of a first data sub-packet of a first data packet is correctly obtained for the first time, obtain, by means of calculation according to the transmission resource of the first data sub-packet, at least one transmission resource used by at least one second data sub-packet of the first data packet, where the first data sub-packet is a data sub-packet that is sent first in the data packet.

In this embodiment, a data packet is transmitted once or for multiple times, and there is corresponding control information, also referred to as scheduling information, for each transmission. A transmit end device generates control information for each data sub-packet corresponding to a data packet, to indicate, independently or together with another control information bit, a time resource and a frequency resource used by a data sub-packet transmitted for the first time in a data packet to which the data sub-packet belongs.

The receive end device may obtain the transmission resource of the data sub-packet transmitted first from the control information of the data sub-packet correctly received for the first time, and obtain, by means of calculation with reference to another control information bit, transmission resource information used by another data sub-packet (that is, for an $n^{th}$ (n=2, 3, . . . ) time of transmission) of the data packet, that is, a transmission resource used for transmitting another second data sub-packet of the data packet to which the data sub-packet belongs each time except a current transmission.

Figure 4B:
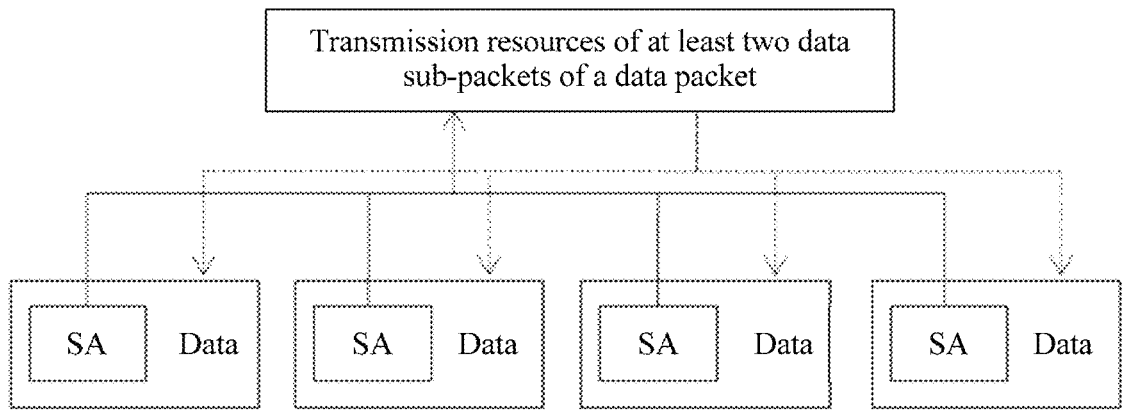
FIG. 4b is a schematic diagram of information of transmitting a data packet for four times.

The following gives an example. FIG. 4b is a schematic diagram of information of transmitting a data packet for four times. As shown in FIG. 4b, a data packet is transmitted for four times, that is, is transmitted as four data sub-packets. In addition, a data sub-packet transmitted each time has corresponding control information. Control information transmitted each time may indicate a transmission resource of at least one data sub-packet of a data packet to which the data sub-packet belongs, so that the receive end device combines data sub-packets obtained by transmitting a same data packet for four times, and detection performance is improved.

S302. Receive a corresponding second data sub-packet on a transmission resource used by each second data sub-packet.

S303. Perform joint processing and decoding on the first data sub-packet and the at least one second data sub-packet, to obtain the first data packet sent by the transmit end.

In this embodiment, the at least one second data sub-packet corresponding to the same first data packet is received on the transmission resource of each second data sub-packet, and joint processing and decoding are performed with reference to the first data sub-packet, to obtain data sub-packets sent by the transmit end device, so that detection performance is improved.

FIG. 4b is used as an example. A data packet is transmitted for four times, and each transmission is corresponding to control information. The control information indicates transmission resources of at least two data sub-packets of the data packet, for example, time-frequency resource information used for sending the first data sub-packet, and a frequency hopping indication is further included, and is used to indicate whether frequency hopping occurs. The receive end device points out frequency domain resource information used for the second to fourth data transmissions by using the time-frequency resource information (for example, resource allocation information) and the frequency hopping indication. That is, when correctly receiving any control information, the receive end device can learn time-frequency resource information of each data transmission according to a time resource pattern of transmission (T-PRT), resource assignment information, and a frequency hopping indication that are included in the control information, perform receiving, multiple joint processing operations, and decoding, and obtain the data packet sent by the transmit end.

Specifically, general control information (that is, SA) further includes T-RPT, resource assignments (RA), frequency hopping indication information, and the like. The T-RPT is used to indicate a time-domain resource location for different transmission of the D2D data packet. Actually, the T-RPT is an index value, and the index value is corresponding to a time-domain resource indication bit table. A location 1 in the table indicates different transmission used for the D2D data packet, and another location is 0. The frequency hopping indication information indicates, by using 1 bit, whether there is an offset between different transmission at frequency domain resource locations, that is, whether frequency hopping occurs between subframes. 1 indicates yes, and 0 indicates no. If same transmission occupies a same frequency-domain resource location on two timeslots of a subframe, no frequency hopping occurs between subframes. The RA indicates a start location of occupying a frequency domain resource in a first timeslot for first transmission and a quantity of occupied consecutive PRBs. When no frequency hopping occurs, each transmission occupies a same resource location in a frequency domain. When frequency hopping occurs, each transmission has an offset at a frequency domain resource location. A frequency hopping manner is classified into a type I and a type II.

A specific operation manner is as follows:

$N_{UL\_hop}$ most significant bits of the RA are used to indicate a type of frequency hopping to be used. A determining manner of $N_{UL\_hop}$ is related to a quantity of uplink physical resource blocks (PRB). For details, refer to Table 1.

TABLE 1

Number of frequency hopping bits $N_{UL\_hop}$ vs. system bandwidth

| System BW $N_{RB}^{UL}$ | #Hopping bits for 2nd slot RA ($N_{UL\_hop}$) |
|---|---|
| 6-49 | 1 |
| 50-110 | 2 |

For a correspondence between values of $N_{UL\_hop}$ bits and a frequency hopping type, refer to Table 2.

TABLE 2

Hopping bit definition

| System BW $N_{RB}^{UL}$ | Number of frequency hopping bits | Information in frequency hopping bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i)) \bmod N_{RB}^{PUSCH}$ |
|  |  | 1 | Type 2 PUSCH hopping |
| 50-110 | 2 | 00 | $(\lfloor N_{RB}^{PUSCH}/4 \rfloor + \tilde{n}_{PRB}^{S1}(i)) \bmod N_{RB}^{PUSCH}$ |
|  |  | 01 | $(-\lfloor N_{RB}^{PUSCH}/4 \rfloor + \tilde{n}_{PRB}^{S1}(i)) \bmod N_{RB}^{PUSCH}$ |
|  |  | 10 | $(\lfloor N_{RB}^{PUSCH}/2 \rfloor + \tilde{n}_{PRB}^{S1}(i)) \bmod N_{RB}^{PUSCH}$ |
|  |  | 11 | Type 2 PUSCH hopping |

After $N_{UL\_hop}$ bits are removed from the RA, there are remaining $y=\lceil \log_2 (N_{RB}^{UL}(N_{RB}^{UL}+1)/2) \rceil - N_{UL\_hop}$ bits, and these bits are referred to as resource indication values (English: Resource Indication Value, RIV for short).

When $(L_{CRBs}-1) \leq \lfloor N_{RB}^{UL}/2 \rfloor$, $RIV=N_{RB}^{UL}(L_{CRBs}-1)+RB_{START}$.

Otherwise, $RIV=N_{RB}^{UL}(N_{RB}^{UL}-L_{CRBs}-1)+(N_{RB}^{UL}-1-RB_{START})$.

According to the foregoing quantity relationship, $RB_{START}$ and $L_{CRBs}$ may be calculated according to RIV. $(L_{CRBs}-1) \leq \lfloor N_{RB}^{UL}/2 \rfloor$ is used as an example, $RB_{START}=\lfloor RIV/N_{RB}^{UL} \rfloor$, and $L_{CRBs}=RIV \bmod N_{RB}^{UL}$.

In another case, similar calculation may also be performed. $RB_{START}$ is the smallest sequence value in PRBs occupied for one transmission in a frequency domain, and $L_{CRBs}$ is a quantity of consecutive PRBs used for the transmission from an $(RB_{START})^{th}$ PRB.

The frequency hopping type I is used as an example for description below.

Frequency hopping type I: As shown in Table 2, corresponding $\tilde{n}_{PRB}(i)$ may be obtained by using a frequency hopping bit, and $N_{RB}^{PUSCH}=N_{RB}^{UL}-\tilde{N}_{RB}^{HO}-(N_{RB}^{UL} \bmod 2)$. When $N_{RB}^{HO}$ is an odd number, $\tilde{N}_{RB}^{HO}=N_{RB}^{HO}+1$; otherwise, $\tilde{N}_{RB}^{HO}=N_{RB}^{HO}$. $N_{RB}^{HO}$ is a quantity of PRBs used for PUCCH transmission in the frequency domain.

CURRENT_TX_NB indicates a quantity of times of transmitting a data packet, and is 0 for initial transmission. CURRENT_TX_NB is added by 1 accordingly for each subsequent retransmission.

The smallest sequence value in the PRBs occupied by transmission corresponding to CURRENT_TX_NB that is an even number is $n_{PRB}^{S1}(i)$, that is, a start PRB sequence number is $n_{PRB}^{S1}(i)=\tilde{n}_{PRB}^{S1}(i)+\tilde{N}_{RB}^{HO}/2$, and $n_{PRB}^{S1}(i)=RB_{START}$. The smallest sequence value in the PRBs occupied by transmission corresponding to CURRENT_TX_NB that is an odd number is $n_{PRB}(i)$, that is, a start PRB sequence number is $n_{PRB}(i)=\tilde{n}_{PRB}(i)+\tilde{N}_{RB}^{HO}/2$. Starting from start PRBs of a first timeslot and a second timeslot, there are $L_{CRBs}$ consecutive PRBs that can be used for transmission.

The receive end device can learn, in the foregoing computation manner, time-frequency resource information of each data transmission according to the time resource pattern of transmission (T-PRT), the resource assignment information, and the frequency hopping indication that are included in the control information.

In the data packet transmission method provided in this embodiment, the data sub-packet of the to-be-sent data packet and the corresponding control information are transmitted in a multiplexing manner, so that performance losses caused by separate transmission of the data sub-packet and the control information may be reduced. Each piece of control information indicates time-frequency resource information used for multiple transmissions of a data packet. The receive end device can obtain, by receiving any control information, time-frequency resources used for multiple transmissions of a data packet, and may perform combination receiving on data of multiple transmitted data sub-packets of the data packet, so that receiving reliability is improved. Further, after demodulating control information of a data sub-packet, the receive end device can directly find, according to time-frequency resource information included in the control information, a time-frequency resource location for transmitting another data sub-packet corresponding to a same data packet. Therefore, the receive end device does not need to detect multiple pieces of control information of different data sub-packets of the same data packet, and processing complexity is reduced.

Figure 5:
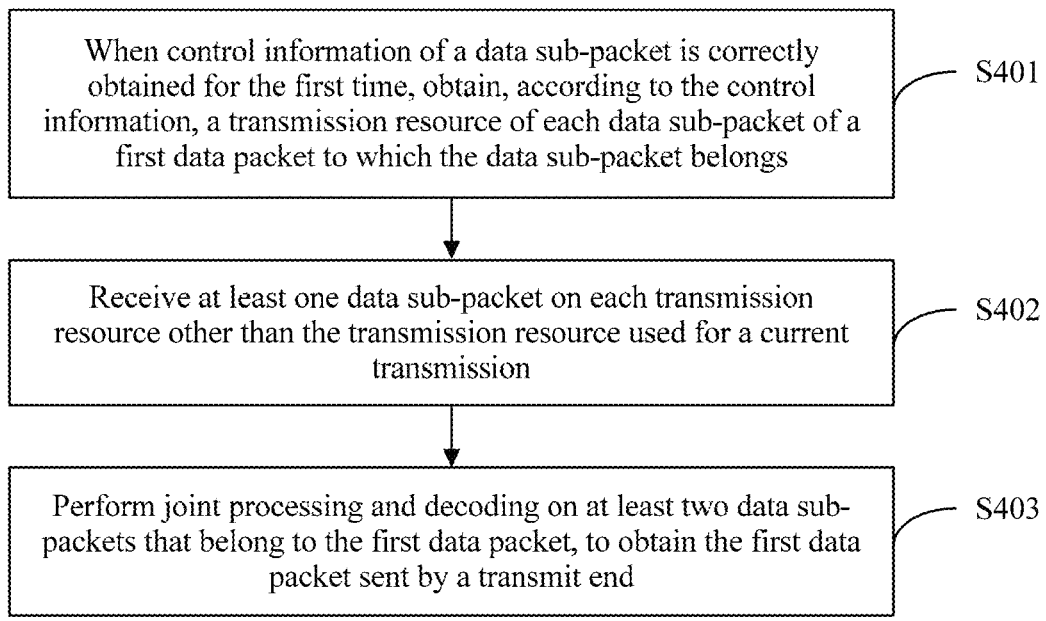
FIG. 5 is a flowchart of a data packet transmission method according to Embodiment 4 of the present disclosure.

FIG. 5 is a flowchart of a data packet transmission method according to Embodiment 4 of the present disclosure. As shown in FIG. 5, on the basis of the communications scenario shown in FIG. 1 and the embodiment shown in FIG. 3, the solution is executed by a receive end device. If control information of each data sub-packet includes a transmission resource of each data sub-packet of a first data packet to which the data sub-packet belongs, specific implementation steps of the step S202 in an embodiment in FIG. 3 include the following steps.

S401. When the control information of the data sub-packet is correctly obtained for the first time, obtain, according to the control information, the transmission resource of each data sub-packet of the first data packet to which the data sub-packet belongs.

In this embodiment, similar to the foregoing embodiment shown in FIG. 4a, the transmit end device generates control information for each data sub-packet corresponding to a data packet, to indicate, independently or together with another control information bit, a time frequency resource used for each transmission of the data packet, that is, a transmission resource. Provided that the receive end device correctly receives and decodes control information of a data sub-packet once, and obtains the control information, the receive end device can obtain time-frequency resource information used by each transmitted data sub-packet of the data packet, and then receive these data sub-packets corresponding to a same data packet on corresponding time-frequency resources.

S402. Receive at least one data sub-packet on each transmission resource other than the transmission resource used for a current transmission.

S403. Perform joint processing and decoding on the at least two data sub-packets that belong to the first data packet, to obtain the first data packet sent by the transmit end.

Joint processing and decoding are performed on the obtained at least two data sub-packets that belong to the first data packet, to obtain the first data packet sent by the transmit end, so that detection performance is improved.

In the data packet transmission method provided in this embodiment, the data sub-packet of the to-be-sent data packet and the corresponding control information are transmitted in a multiplexing manner, so that performance losses caused by separate transmission of the data sub-packet and the control information may be reduced. Each piece of control information indicates time-frequency resource information used for multiple transmissions of a data packet. The receive end device can obtain, by receiving any control information, time-frequency resources used for multiple transmissions of a data packet, and may perform combination receiving on data of multiple transmitted data sub-packets of the data packet, so that receiving reliability is improved. Further, after demodulating control information of a data sub-packet, the receive end device can directly obtain a time-frequency resource location for transmitting another data sub-packet corresponding to a same data packet, so that multiple pieces of control information of different data sub-packets of the same data packet avoid to be detected, and processing complexity is reduced.

Figure 6:
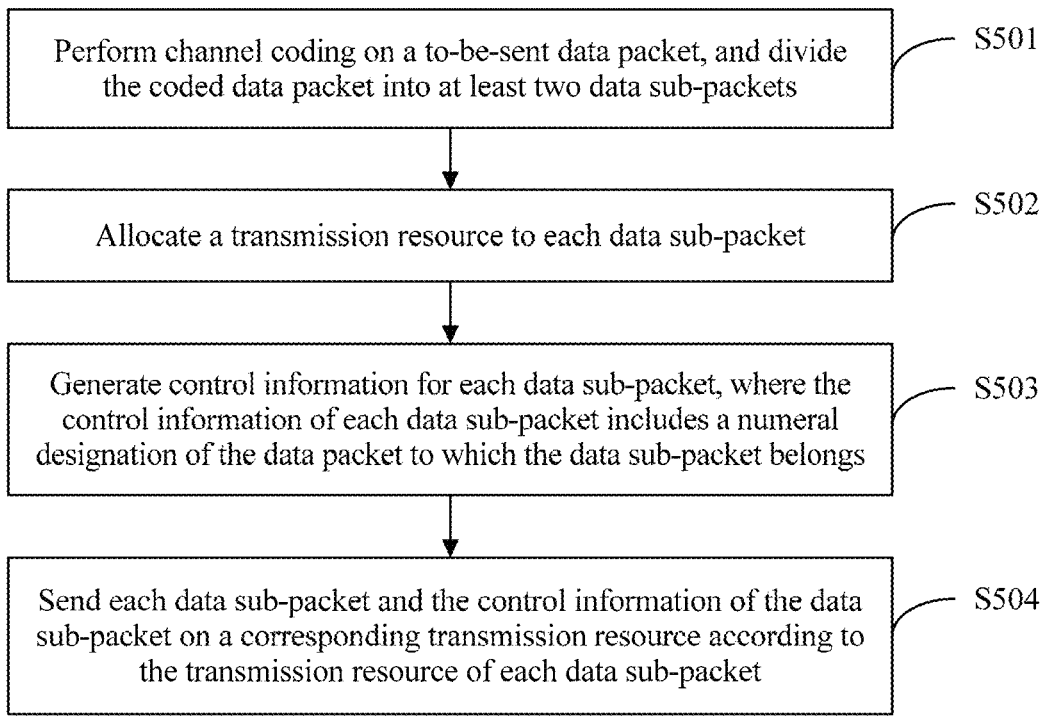
FIG. 6 is a flowchart of a data packet transmission method according to Embodiment 5 of the present disclosure.

FIG. 6 is a flowchart of a data packet transmission method according to Embodiment 5 of the present disclosure. As shown in FIG. 6, in a communications scenario shown in FIG. 1, the solution is executed by a transmit end device. Control information of a data sub-packet may further include an ID and/or a numeral designation of a data packet to which the data sub-packet belongs. Specific steps of the data packet transmission method of the present disclosure are as follows.

S501. Perform channel coding on a to-be-sent data packet, and divide the coded data packet into at least two data sub-packets.

S502. Allocate a transmission resource to each data sub-packet.

In this embodiment, generally, the to-be-sent data packet is relatively large, and therefore, the data packet cannot be directly sent. Therefore, the data packet needs to be blocked after being coded, and the data packet is divided into multiple data sub-packets to be separately transmitted. When the data packet is divided into the multiple data sub-packets, each data sub-packet needs to be allocated a transmission resource, including a time resource and a frequency resource.

S503. Generate control information for each data sub-packet, where the control information of each data sub-packet includes a numeral designation of the data packet to which the data sub-packet belongs.

In this embodiment, the transmit end device needs to generate the control information for the data sub-packet according to the transmission resource of each data sub-packet of the to-be-sent data packet, that is, insert a control information bit into an information bit of the to-be-sent data sub-packet. In addition to a modulation coding manner used by a data information bit, the control information further includes information that can identify the first data packet, for example, a set numeral designation or an identity of the data packet. After successfully receiving multiple data sub-packets, the receive end device may determine a data sub-packet that belongs to a same data packet according to the identity (ID) of the first data packet and the preset numeral designation of the first data packet.

S504. Send each data sub-packet and the control information of the data sub-packet on a corresponding transmission resource according to the transmission resource of each data sub-packet.

In this embodiment, the control information that is used to identify the data packet to which the data sub-packet belongs is added into each data sub-packet, and each data sub-packet is sent on the corresponding transmission resource, and may be sent to a receive end device in a unicast manner, or may be sent in a multicast or a broadcast manner. This is not limited in the present disclosure.

In the data packet transmission method provided in this embodiment, the transmit end device inserts the control information bit into each data sub-packet of the to-be-sent data packet, for example, the numeral designation, to indicate the data packet to which the data sub-packet belongs, and sends each data sub-packet on the corresponding transmission resource, so that the receive end device obtains, according to the control information, at least two data sub-packets that belong to the same first data packet from received data sub-packets, and performs joint processing to obtain the first data packet. The data packet and the control information are transmitted simultaneously, and the control information that is used to identify the data packet to which the data sub-packet belongs is added, so that the receive end device may recognize multiple transmissions of a same data packet according to the control information of each data sub-packet, and perform joint processing on multiple data sub-packets corresponding to the same data packet to obtain the data packet, and data packet transmission reliability is improved.

Figure 7:
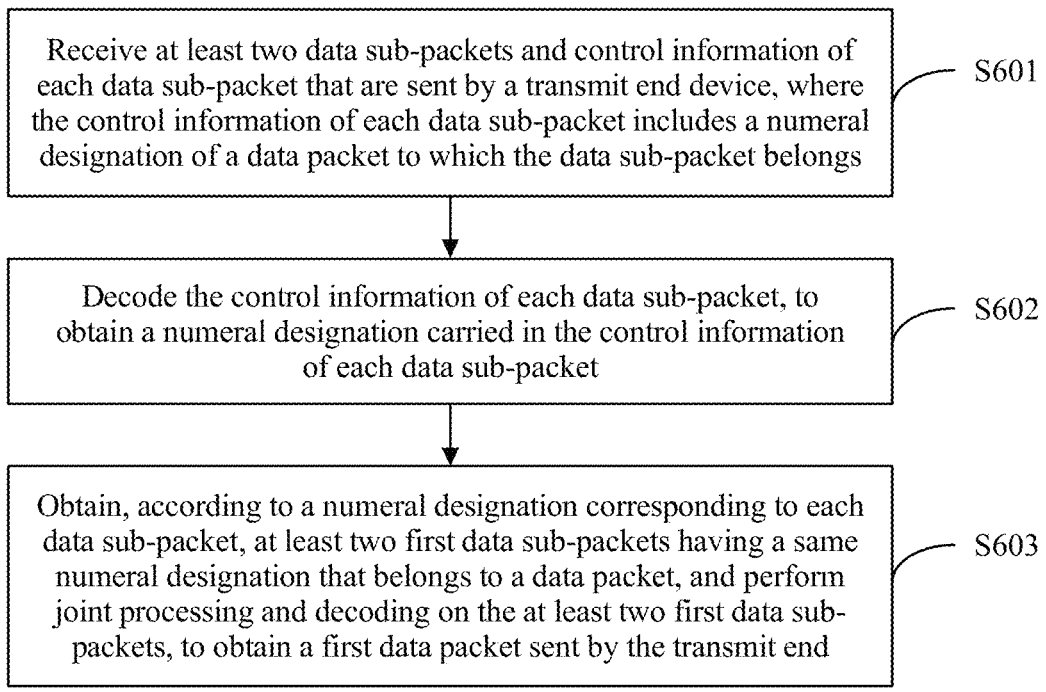
FIG. 7 is a flowchart of a data packet transmission method according to Embodiment 6 of the present disclosure.

FIG. 7 is a flowchart of a data packet transmission method according to Embodiment 6 of the present disclosure. As shown in FIG. 7, in a communications scenario shown in FIG. 1, corresponding to the embodiment in FIG. 6, the solution is executed by a receive end device. Control information of a data sub-packet may further include an ID and/or a numeral designation of a data packet to which the data sub-packet belongs. Specific steps of the data packet transmission method of the present disclosure are as follows.

S601. Receive at least two data sub-packets and control information of each data sub-packet that are sent by a transmit end device, where the control information of each data sub-packet includes a numeral designation of a data packet to which the data sub-packet belongs.

In this embodiment, as shown in FIG. 4b, the transmit end device adds a numeral designation or a data packet ID into the control information of each data sub-packet of the data packet, to indicate, independently or together with another control information, the data packet to which the data sub-packet belongs. The numeral designation is used as an example, and may be preconfigured in a system, or may be determined by the transmit end device, for example, a number is randomly selected. The receive end device obtains the ID or the numeral designation of the control information bit according to the control information bit of each data sub-packet.

S602. Decode the control information of each data sub-packet, to obtain a numeral designation carried in the control information of each data sub-packet.

S603. Obtain, according to a numeral designation corresponding to each data sub-packet, at least two first data sub-packets having a same numeral designation that belongs to a data packet, and perform joint processing and decoding on the at least two first data sub-packets, to obtain a first data packet sent by the transmit end.

In this embodiment, a data sub-packet having the same data packet ID or numeral designation is obtained, for example, at least two first data sub-packets are obtained. The receive end device performs joint processing and decoding on the at least two first data sub-packets, that is, data sub-packets obtained from multiple transmissions of the same data packet, to obtain the first data packet.

In the data packet transmission method provided in this embodiment, the control information is generated for the data sub-packet, for example, the numeral designation, to identify a data packet to which the data sub-packet belongs, and the control information and the data sub-packet are sent simultaneously, so that performance losses caused by separate transmission of the control information and the data sub-packet are reduced, and data packet transmission reliability is improved. In multicast communication or broadcast communication, the receive end device may recognize multiple transmitted data sub-packets of a data packet, and may perform joint processing on data sub-packets obtained from multiple transmissions of the data packet, so that data packet transmission reliability is further improved.

Figure 8:
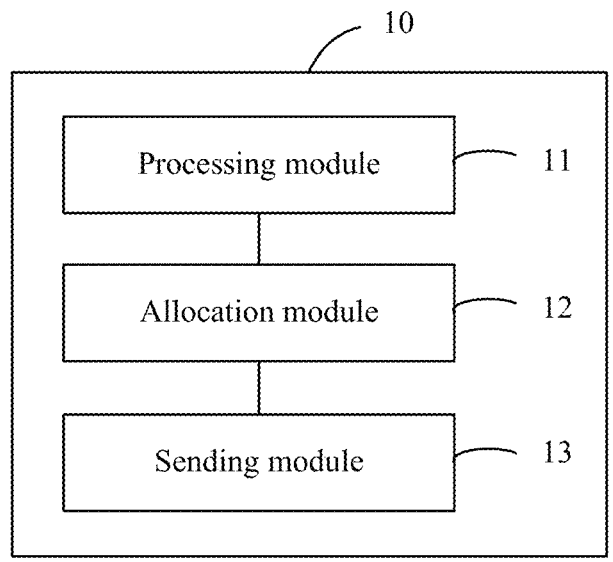
FIG. 8 is a schematic structural diagram of a transmit end device according to Embodiment 1 of the present disclosure.

FIG. 8 is a schematic structural diagram of a transmit end device according to Embodiment 1 of the present disclosure. As shown in FIG. 8, the transmit end device 10 includes a processing module 11, an allocation module 12, and a sending module 13.

The processing module 11 is configured to: perform channel coding on a to-be-sent data packet, and divide the coded data packet into at least two data sub-packets.

The allocation module 12 is configured to allocate a transmission resource to each data sub-packet.

The processing module 11 is further configured to generate control information for each data sub-packet according to transmission resources of the at least two data sub-packets, where the control information of each data sub-packet is used to indicate the transmission resources of the at least two data sub-packets of the data packet to which the data sub-packet belongs.

The sending module 13 is configured to send each data sub-packet and the control information of the data sub-packet on a corresponding transmission resource.

The transmit end device provided in this embodiment is configured to execute technical solutions of a transmit end device in the method embodiments in FIG. 1 to FIG. 7, and an implementation principle and a technical effect of the transmit end device are similar to those of the technical solutions. The control information is generated for the data sub-packet, for example, a numeral designation, to identify a data packet to which the data sub-packet belongs, and the control information and the data sub-packet are sent simultaneously, so that performance losses caused by separate transmission of the control information and the data sub-packet are reduced, and data packet transmission reliability is improved. In multicast communication or broadcast communication, a receive end device may recognize multiple transmitted data sub-packets of a data packet, and may perform joint processing on data sub-packets obtained from multiple transmissions of the data packet, so that data packet transmission reliability is further improved.

According to a transmit end device in Embodiment 2 of the present disclosure, the control information generated by the processing module 11 for each data sub-packet is specifically used to indicate a transmission resource of a first data sub-packet of the data packet to which the data sub-packet belongs. The first data sub-packet is a data sub-packet that is sent first in the data packet, and the transmission resource includes a time resource and a frequency resource.

Optionally, the processing module 11 is further configured to determine a transmission format for each data sub-packet, and the transmission format includes a modulation order and/or a coding redundancy version number.

The processing module 11 is specifically configured to generate the control information for each data sub-packet according to the transmission resources and transmission formats of the at least two data sub-packets, where the control information is further used to indicate the transmission formats of the at least two data sub-packets of the data packet to which the data sub-packet belongs.

The transmit end device provided in this embodiment is configured to execute the technical solutions of the transmit end device in the method embodiments in FIG. 1 to FIG. 7, and an implementation principle and a technical effect of the transmit end device are similar to those of the technical solutions, and are not described herein again.

Figure 9:
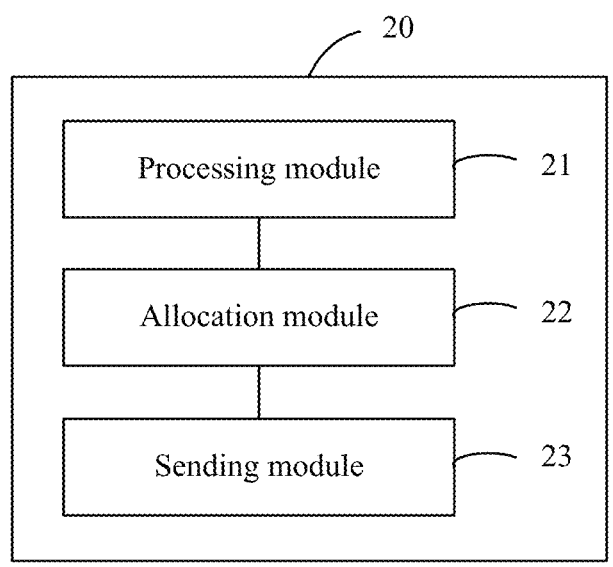
FIG. 9 is a schematic structural diagram of a transmit end device according to Embodiment 3 of the present disclosure.

FIG. 9 is a schematic structural diagram of a transmit end device according to Embodiment 3 of the present disclosure. As shown in FIG. 9, the transmit end device 20 includes a processing module 21, an allocation module 22, and a sending module 23.

The processing module 21 is configured to: perform channel coding on a to-be-sent data packet, and divide the coded data packet into at least two data sub-packets.

The allocation module 22 is configured to allocate a transmission resource to each data sub-packet.

The processing module 21 is further configured to generate control information for each data sub-packet, where the control information of each data sub-packet includes a numeral designation of the data packet to which the data sub-packet belongs.

The sending module 23 is configured to send each data sub-packet and the control information of the data sub-packet on a corresponding transmission resource according to the transmission resource of each data sub-packet.

The transmit end device provided in this embodiment is configured to execute the technical solutions of the transmit end device in the method embodiments in FIG. 1 to FIG. 7, and an implementation principle and a technical effect of the transmit end device are similar to those of the technical solutions, and are not described herein again.

Figure 10:
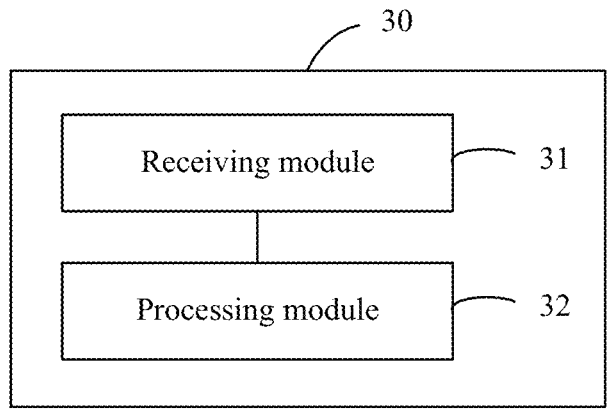
FIG. 10 is a schematic structural diagram of a receive end device according to Embodiment 1 of the present disclosure.

FIG. 10 is a schematic structural diagram of a receive end device according to Embodiment 1 of the present disclosure. As shown in FIG. 10, the receive end device 30 includes a receiving module 31 and a processing module 32.

The receiving module 31 is configured to receive at least two data sub-packets and control information of each data sub-packet that are sent by a transmit end device, where the control information of each data sub-packet is used to indicate transmission resources of the at least two data sub-packets of the data packet to which the data sub-packet belongs.

The processing module 32 is configured to: decode the control information of each data sub-packet, to obtain at least two data sub-packets that belong to a same data packet; and perform joint processing on the at least two data sub-packets, to obtain a first data packet sent by the transmit end device.

The receive end device provided in this embodiment is configured to execute technical solutions of a receive end device in the method embodiments in FIG. 1 to FIG. 7, and an implementation principle and a technical effect of the receive end device are similar to those of the technical solutions. The control information is generated by the receive end device for the data sub-packet, for example, a numeral designation, to identify a data packet to which the data sub-packet belongs, and the control information and the data sub-packet are sent simultaneously, so that performance losses caused by separate transmission of the control information and the data sub-packet are reduced, and data packet transmission reliability is improved. In multicast communication or broadcast communication, the receive end device may recognize multiple transmitted data sub-packets of a data packet, and may perform joint processing on data sub-packets obtained from multiple transmissions of the data packet, so that data packet transmission reliability is further improved.

According to a receive end device in Embodiment 2 of the present disclosure, on the basis of the foregoing Embodiment 1, the control information of each data sub-packet that is received by the receiving module 31 is specifically used to indicate a transmission resource of a first data sub-packet of the data packet to which the data sub-packet belongs. The first data sub-packet is a data sub-packet that is sent first in the data packet, and the transmission resource includes a time resource and a frequency resource.

Optionally, the processing module 32 is specifically configured to: when a transmission resource of a first data sub-packet of the first data packet is correctly obtained for the first time, obtain, by means of calculation according to the transmission resource of the first data sub-packet, at least one transmission resource used by at least one second data sub-packet of the first data packet, where the first data sub-packet is a data sub-packet that is sent first in the data packet.

The receiving module 31 is further configured to receive a corresponding second data sub-packet on a transmission resource used by each second data sub-packet.

The processing module 32 is further configured to perform joint processing and decoding on the first data sub-packet and the at least one second data sub-packet, to obtain the first data packet sent by the transmit end.

Optionally, if the control information of each data sub-packet includes a transmission resource of each data sub-packet of a first data packet to which the data sub-packet belongs, the processing module 32 is configured to: when the control information of the data sub-packet is correctly obtained for the first time, obtain, according to the control information, the transmission resource of each data sub-packet of the first data packet to which the data sub-packet belongs.

The receiving module 31 is further configured to receive at least one data sub-packet on each transmission resource other than the transmission resource used for a current transmission.

The processing module 32 is further configured to perform joint processing and decoding on the at least two data sub-packets that belong to the first data packet, to obtain the first data packet sent by the transmit end.

The receive end device provided in this embodiment is configured to execute the technical solutions of the receive end device in the method embodiments in FIG. 1 to FIG. 7, and an implementation principle and a technical effect of the receive end device are similar to those of the technical solutions, and are not described herein again.

Figure 11:
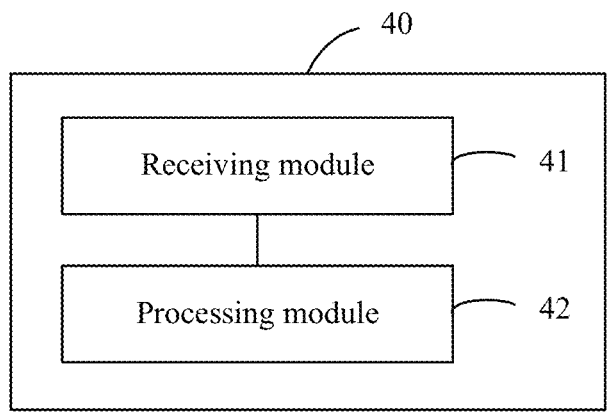
FIG. 11 is a schematic structural diagram of a receive end device according to Embodiment 3 of the present disclosure.

FIG. 11 is a schematic structural diagram of a receive end device according to Embodiment 3 of the present disclosure. As shown in FIG. 11, the receive end device 40 includes a receiving module 41 and a processing module 42.

The receiving module 41 is configured to receive at least two data sub-packets and control information of each data sub-packet that are sent by a transmit end device, where the control information of each data sub-packet includes a numeral designation of a data packet to which the data sub-packet belongs.

The processing module 42 is configured to decode the control information of each data sub-packet, to obtain a numeral designation carried in the control information of each data sub-packet.

The processing module 42 is further configured to: obtain, according to a numeral designation corresponding to each data sub-packet, at least two first data sub-packets having a same numeral designation that belongs to a data packet, and perform joint processing and decoding on the at least two first data sub-packets, to obtain a first data packet sent by the transmit end.

The receive end device provided in this embodiment is configured to execute the technical solutions of the receive end device in the method embodiments in FIG. 1 to FIG. 7, and an implementation principle and a technical effect of the receive end device are similar to those of the technical solutions, and are not described herein again.

Figure 12:
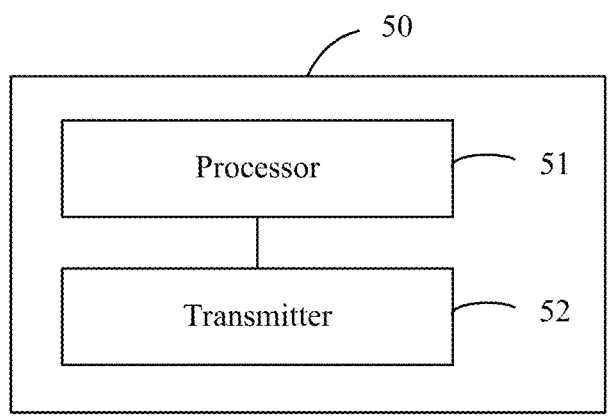
FIG. 12 is a schematic structural diagram of an entity of a transmit end device according to Embodiment 1 of the present disclosure.

FIG. 12 is a schematic structural diagram of an entity of a transmit end device according to Embodiment 1 of the present disclosure. As shown in FIG. 12, the transmit end device 50 includes:

a processor 51, configured to: perform channel coding on a to-be-sent data packet, and divide the coded data packet into at least two data sub-packets, where the processor 51 is further configured to allocate a transmission resource to each data sub-packet; and the processor 51 is further configured to generate control information for each data sub-packet according to transmission resources of the at least two data sub-packets, where the control information of each data sub-packet is used to indicate the transmission resources of the at least two data sub-packets of the data packet to which the data sub-packet belongs; and a transmitter 52, configured to send each data sub-packet and the control information of the data sub-packet on a corresponding transmission resource.

The transmit end device provided in this embodiment is configured to execute the technical solutions of the transmit end device in the method embodiments in FIG. 1 to FIG. 7, and an implementation principle and a technical effect of the transmit end device are similar to those of the technical solutions, and are not described herein again.

Figure 13:
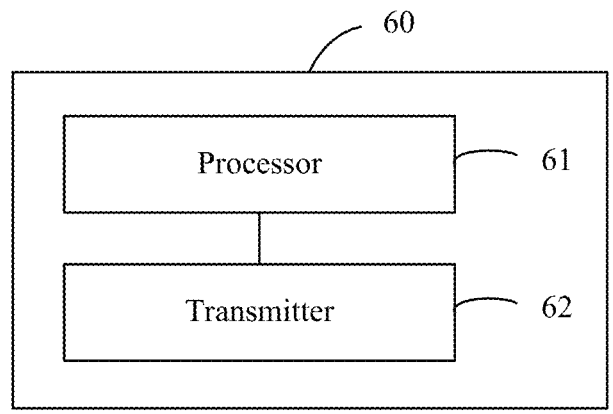
FIG. 13 is a schematic structural diagram of an entity of a transmit end device according to Embodiment 2 of the present disclosure.

FIG. 13 is a schematic structural diagram of an entity of a transmit end device according to Embodiment 2 of the present disclosure. As shown in FIG. 13, the transmit end device 60 includes:

a processor 61, configured to: perform channel coding on a to-be-sent data packet, and divide the coded data packet into at least two data sub-packets, where the processor 61 is further configured to allocate a transmission resource to each data sub-packet; and the processor 61 is further configured to generate control information for each data sub-packet, where the control information of each data sub-packet includes a numeral designation of the data packet to which the data sub-packet belongs; and a transmitter 62, configured to send each data sub-packet and the control information of the data sub-packet on a corresponding transmission resource according to the transmission resource of each data sub-packet.

The transmit end device provided in this embodiment is configured to execute the technical solutions of the transmit end device in the method embodiments in FIG. 1 to FIG. 7, and an implementation principle and a technical effect of the transmit end device are similar to those of the technical solutions, and are not described herein again.

Figure 14:
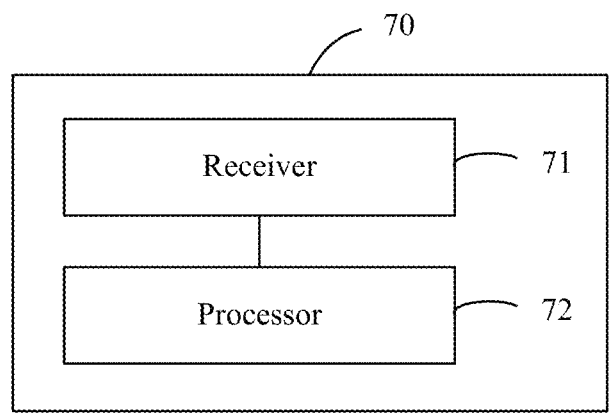
FIG. 14 is a schematic structural diagram of an entity of a receive end device according to Embodiment 1 of the present disclosure.

FIG. 14 is a schematic structural diagram of an entity of a receive end device according to Embodiment 1 of the present disclosure. As shown in FIG. 14, the receive end device 70 includes:

a receiver 71, configured to receive at least two data sub-packets and control information of each data sub-packet that are sent by a transmit end device, where the control information of each data sub-packet is used to indicate transmission resources of the at least two data sub-packets of the data packet to which the data sub-packet belongs; and a processor 72, configured to: decode the control information of each data sub-packet, to obtain at least two data sub-packets that belong to a same data packet; and perform joint processing on the at least two data sub-packets, to obtain a first data packet sent by the transmit end device.

The receive end device provided in this embodiment is configured to execute the technical solutions of the receive end device in the method embodiments in FIG. 1 to FIG. 7, and an implementation principle and a technical effect of the receive end device are similar to those of the technical solutions, and are not described herein again.

Figure 15:
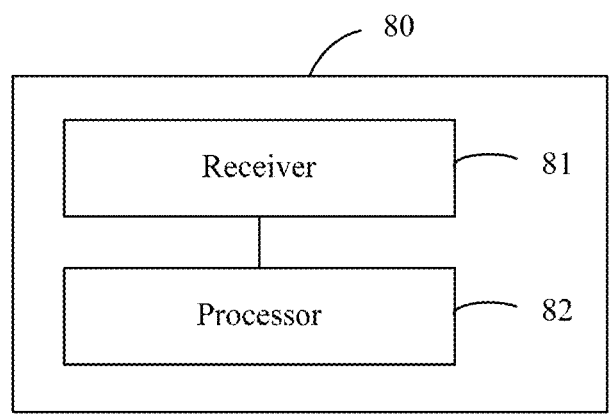
FIG. 15 is a schematic structural diagram of an entity of a receive end device according to Embodiment 2 of the present disclosure.

FIG. 15 is a schematic structural diagram of an entity of a receive end device according to Embodiment 2 of the present disclosure. As shown in FIG. 15, the receive end device 80 includes:

a receiver 81, configured to receive at least two data sub-packets and control information of each data sub-packet that are sent by a transmit end device, where the control information of each data sub-packet includes a numeral designation of a data packet to which the data sub-packet belongs; and a processor 82, configured to decode the control information of each data sub-packet, to obtain a numeral designation carried in the control information of each data sub-packet, where the processor 82 is further configured to: obtain, according to a numeral designation corresponding to each data sub-packet, at least two first data sub-packets having a same numeral designation that belongs to a data packet, and perform joint processing and decoding on the at least two first data sub-packets, to obtain a first data packet sent by the transmit end.

The receive end device provided in this embodiment is configured to execute the solutions of the receive end device in the method embodiments in FIG. 1 to FIG. 7, and an implementation principle and a technical effect of the receive end device are similar to those of the technical solutions, and are not described herein again.

In the embodiments of the foregoing receive end device and transmit end device, it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the method disclosed with reference to the embodiments of the present disclosure may be directly performed by a hardware processor, or may be performed by using a combination of hardware and software modules in the processor.

Persons of ordinary skill in the art may understand that all or some of the steps of the method embodiments may be implemented by a program instructing relevant hardware. The program may be stored in a computer-readable storage medium. When the program is executed, the steps of the methods in the embodiments are performed. The storage medium includes: a read-only memory (ROM), a RAM, a flash memory, a hard disk, a solid state disk, a magnetic tape, a floppy disk, an optical disc, and any combination thereof.

Finally, it should be noted that the foregoing embodiments are merely intended for describing the technical solutions of

What is claimed is:

1. A data packet transmission method, comprising:
performing channel coding on a to-be-sent data packet, and dividing the coded data packet into at least two data sub-packets;
allocating a transmission resource to each data sub-packet;
generating control information for each data sub-packet according to transmission resources of the at least two data sub-packets, wherein the control information of each data sub-packet indicates the transmission resources of the at least two data sub-packets of the to-be-sent data packet, wherein the control information of each data sub-packet indicates a transmission resource of a first data sub-packet of the at least two data sub-packets;
sending each data sub-packet and the control information of the data sub-packet on a corresponding transmission resource;
receiving a control information of each data sub-packet;
decoding the received control information of each data sub-packet, to obtain at least two data sub-packets, comprising, when a transmission resource of a first data sub-packet of a first data packet is correctly obtained for the first time, obtaining, by a calculation according to the transmission resource of the first data sub-packet, at least one transmission resource used by at least one second data sub-packet of the first data packet, wherein the first data sub-packet is a data sub-packet that is sent first in the first data packet;
receiving a corresponding second data sub-packet on a transmission resource used by the at least one second data sub-packet; and
performing joint processing and decoding on the first data sub-packet and the at least one second data sub-packet, to obtain the first data packet sent by a transmit end.

2. The method according to claim 1, wherein a transmission resource comprises a time resource and a frequency resource.

3. The method according to claim 1, wherein the method further comprises:
determining a transmission format for each data sub-packet, wherein the transmission format comprises a modulation order and/or a coding redundancy version number; and
generating control information for each data sub-packet according to transmission resources of the at least two data sub-packets comprises:
generating the control information for each data sub-packet according to the transmission resources and transmission formats of the at least two data sub-packets, wherein the control information indicates the transmission formats of the at least two data sub-packets of the to-be-sent data packet.

4. A data packet transmission method, comprising:
receiving at least two data sub-packets and control information of each data sub-packet sent by a transmit end device, wherein the control information of each data sub-packet indicates transmission resources of the at least two data sub-packets of a data packet to which the at least two data sub-packets belong, wherein the control information of each data sub-packet indicates a transmission resource of the data sub-packet of the data packet to which the data sub-packet belongs;
decoding the received control information of each data sub-packet, to obtain the at least two data sub-packets, comprising, when a transmission resource of a first data sub-packet of a first data packet is correctly obtained for the first time, obtaining, by a calculation according to the transmission resource of the first data sub-packet, at least one transmission resource used by at least one second data sub-packet of the first data packet, wherein the first data sub-packet is a data sub-packet that is sent first in the first data packet;
receiving a corresponding second data sub-packet on a transmission resource used by the at least one second data sub-packet; and
performing joint processing and decoding on the first data sub-packet and the at least one second data sub-packet, to obtain the first data packet sent by the transmit end device.

5. The method according to claim 4, wherein the transmission resource comprises a time resource and a frequency resource.

6. The method according claim 4, wherein the control information of each data sub-packet indicates transmission formats of the at least two data sub-packets, and the transmission formats comprise a modulation order and/or a coding redundancy version number.

7. The method according to claim 4, wherein when the control information of each data sub-packet comprises a transmission resource of each data sub-packet, decoding the control information of each data sub-packet, to obtain at least two data sub-packets, and performing joint processing on the at least two data sub-packets, to obtain the first data packet sent by the transmit end device comprises:
when the control information of the data sub-packet is correctly obtained, obtaining, according to the control information, the transmission resource of each data sub-packet of the first data packet;
receiving at least one data sub-packet on each transmission resource other than the transmission resource used for a current transmission; and
performing joint processing and decoding on the at least two data sub-packets, to obtain the first data packet sent by the transmit end device.

* * * * *